US012685913B2

(12) United States Patent　　(10) Patent No.:　US 12,685,913 B2
Martino　　(45) Date of Patent:　Jul. 21, 2026

(54) SYSTEMS AND METHODS FOR FOOTBALL TRAINING

(71) Applicant: William Martino, Glen Cove, NY (US)

(72) Inventor: William Martino, Glen Cove, NY (US)

( * ) Notice: Subject to any disclaimer, the term of this patent is extended or adjusted under 35 U.S.C. 154(b) by 307 days.

(21) Appl. No.: 17/962,072

(22) Filed: Oct. 7, 2022

(65) Prior Publication Data

US 2024/0115919 A1　　Apr. 11, 2024

(51) Int. Cl.
| *A63B 69/00* | (2006.01) |
| *A63B 24/00* | (2006.01) |
| *A63B 71/06* | (2006.01) |
| *G06T 7/20* | (2017.01) |
| *G06V 40/20* | (2022.01) |

(52) U.S. Cl.
CPC ........ *A63B 69/002* (2013.01); *A63B 24/0006* (2013.01); *A63B 24/0021* (2013.01); *A63B 71/0622* (2013.01); *G06T 7/20* (2013.01); *G06V 40/23* (2022.01); *A63B 2024/0009* (2013.01); *A63B 2024/0028* (2013.01); *A63B 2024/0056* (2013.01); *A63B 2071/0625* (2013.01); *A63B 2071/0638* (2013.01); *A63B 2220/05* (2013.01); *A63B 2220/76* (2013.01); *A63B 2220/806* (2013.01); *A63B 2220/807* (2013.01); *A63B 2220/89* (2013.01); *G06T 2207/10048* (2013.01); *G06T 2207/30196* (2013.01); *G06T 2207/30221* (2013.01)

(58) Field of Classification Search
CPC .............. A63B 69/002; A63B 24/0006; A63B 24/0021; A63B 71/0622; A63B 2024/0009; A63B 2024/0028; A63B 2024/0056; A63B 2071/0625; A63B 2071/0638; A63B 2220/05; A63B 2220/76; A63B 2220/806; A63B 2220/807; A63B 2220/89; A63B 2243/007; G06T 7/20; G06T 2207/10048; G06T 2207/30196; G06T 2207/30221; G06V 40/23
USPC ................ 473/422, 438, 446, 409, 251, 266
See application file for complete search history.

(56) References Cited

U.S. PATENT DOCUMENTS

| 5,882,204 | A | * | 3/1999 | Lannazo | ............ | A63B 24/0021 |
| | | | | | | 473/422 |
| 6,308,565 | B1 | * | 10/2001 | French | ............... | A63B 24/0021 |
| | | | | | | 73/379.04 |
| 8,503,086 | B2 | | 8/2013 | French et al. | | |
| 8,926,443 | B2 | | 1/2015 | Woo et al. | | |
| 9,283,432 | B2 | | 3/2016 | Marty et al. | | |
| 9,329,037 | B2 | | 5/2016 | Suk | | |
| 9,752,875 | B2 | | 9/2017 | Suk | | |
| 10,437,658 | B2 | * | 10/2019 | Alonso | ............. | G06K 7/10306 |
| 10,486,050 | B2 | * | 11/2019 | Reilly | .................... | G06V 20/42 |
| 10,943,501 | B2 | * | 3/2021 | Sundquist | .............. | G09B 5/065 |
| 11,024,053 | B1 | * | 6/2021 | Zhang | ...................... | G06T 7/70 |

(Continued)

*Primary Examiner* — Nini F Legesse
(74) *Attorney, Agent, or Firm* — Carter, DeLuca & Farrell LLP

(57) ABSTRACT

A system for football training includes a plurality of imaging devices configured to capture real-time images indicating movement of the football, a processor, and a memory. The memory includes instructions stored thereon, which when executed by the processor cause the system to capture real-time images of the football, determine a telemetry data of the football based on the captured images, and determine instructional feedback in response to the telemetry data of the football.

17 Claims, 5 Drawing Sheets

(56) References Cited

U.S. PATENT DOCUMENTS

| 11,278,787 | B2 * | 3/2022 | O'Dowd | G09B 19/0038 |
| 2006/0204045 | A1 * | 9/2006 | Antonucci | G06T 11/206 |
| | | | | 382/103 |
| 2015/0332450 | A1 | 11/2015 | Marty et al. | |
| 2017/0039881 | A1 * | 2/2017 | Belch | G11B 27/105 |
| 2017/0272842 | A1 * | 9/2017 | Touma | A63B 24/0003 |
| 2018/0342106 | A1 * | 11/2018 | Rosado | G06Q 10/109 |
| 2019/0134506 | A1 * | 5/2019 | Gupta | G09B 19/0038 |
| 2022/0366653 | A1 * | 11/2022 | Sung | G06T 7/73 |

* cited by examiner

500

Start

Capture real-time images of a football by a plurality of imaging devices.

502

Determine a telemetry data of the football based on the captured real-time images.

504

Determine instructional feedback in response to the telemetry data of the football.

506

SYSTEMS AND METHODS FOR FOOTBALL TRAINING

TECHNICAL FIELD

The present disclosure relates generally to the field of sports training. More specifically, an aspect of the present disclosure provides systems and methods for providing instructional feedback.

BACKGROUND

To begin training in a sport, such as American football ("football") or soccer, it is at minimum often necessary to find an established league and purchase equipment. Geographical, financial, and time constraints may make this a challenging endeavor, and there is little that players who cannot join a team can do to improve. Even for players who are part of a team, outside of hiring a private coach at a great expense, there is no accessible way for an individual player to receive meaningful one-on-one feedback regarding their gameplay.

Accordingly, there is interest in novel and improved systems and methods for training.

SUMMARY

An aspect of the present disclosure provides a system for football training. The system includes a plurality of imaging devices configured to capture real-time images indicating movement of the football, a processor, and a memory. The plurality of imaging devices are further configured to capture the images at different perspectives. The memory includes instructions stored thereon, which when executed by the processor cause the system to capture real-time images of the football, determine a telemetry data of the football based on the captured images, and determine instructional feedback in response to the telemetry data of the football.

In an aspect of the present disclosure, the system may further include one or more displays. The instructions, when executed by the processor may further cause the system to display instructional feedback onto the one or more displays.

In another aspect of the present disclosure, the instructions, when executed by the processor may further cause the system to display a virtual reality football environment onto the one or more displays.

In an aspect of the present disclosure, the telemetry data may be determined based on image recognition.

In an aspect of the present disclosure, the system may further include a radar detector configured to generate a signal indicating movement of the football, and the telemetry data may be further determined based on the signal.

In an aspect of the present disclosure, the system may further include an infrared sensor configured to generate a signal indicating movement of the football. The telemetry data may be further determined based on the signal.

In an aspect of the present disclosure, the plurality of imaging devices may be further configured to capture real-time images indicating movements of a user, and the instructions, when executed by the processor may further cause the system to capture real-time images of the user, determine a motion of the user, and determine instructional feedback in response to the determined motion of the user and the telemetry data of the football.

In an aspect of the present disclosure, the system may further include a wind machine. The instructions, when executed by the processor may further cause the system to selectively generate wind by the wind machine.

In another aspect of the present disclosure, the wind machine may be movable and may be disposed in an alley way adjacent to one or more displays.

In an aspect of the present disclosure, the system may further include a speaker. The instructions, when executed by the processor may further cause the system to generate simulated audience noise and play the simulated audience noise by the speaker.

An aspect of the present disclosure provides a method for football training. The method includes capturing real-time images of a football by a plurality of imaging devices, determining a telemetry data of the football based on the captured real-time images, and determining instructional feedback in response to the telemetry data of the football.

In an aspect of the present disclosure, the method may further include displaying instructional feedback onto one or more displays.

In another aspect of the present disclosure, the method may further include displaying a virtual reality football environment onto the one or more displays.

In an aspect of the present disclosure, the method may further include determining the telemetry data based on image recognition.

In an aspect of the present disclosure, the method may further include generating a signal indicating movement of the football by a radar detector and further determining the telemetry data based on the signal.

In an aspect of the present disclosure, the method may further include generating a signal indicating movement of the football by an infrared sensor and further determining the telemetry data based on the signal.

In an aspect of the present disclosure, the method may further include capturing real-time images of a user by the plurality of imaging devices, determining a motion of the user, and further determining instructional feedback in response to the determined motion of the user and the telemetry data of the football.

In an aspect of the present disclosure, the method may further include simulating wind by a wind machine.

In an aspect of the present disclosure, the method may further include generating simulated audience noise and playing the simulated audience noise by a speaker.

An aspect of the present disclosure provides a non-transitory computer-readable medium storing instructions which, when executed by a processor, cause the processor to perform a computer-implemented method for football training, including capturing images of a football by a plurality of imaging devices, determining a telemetry data of the football based on the captured images, and determining instructional feedback in response to the telemetry data of the football.

Further details and aspects of the present disclosure are described in more detail below with reference to the appended drawings.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which.

DETAILED DESCRIPTION

Figure 1:
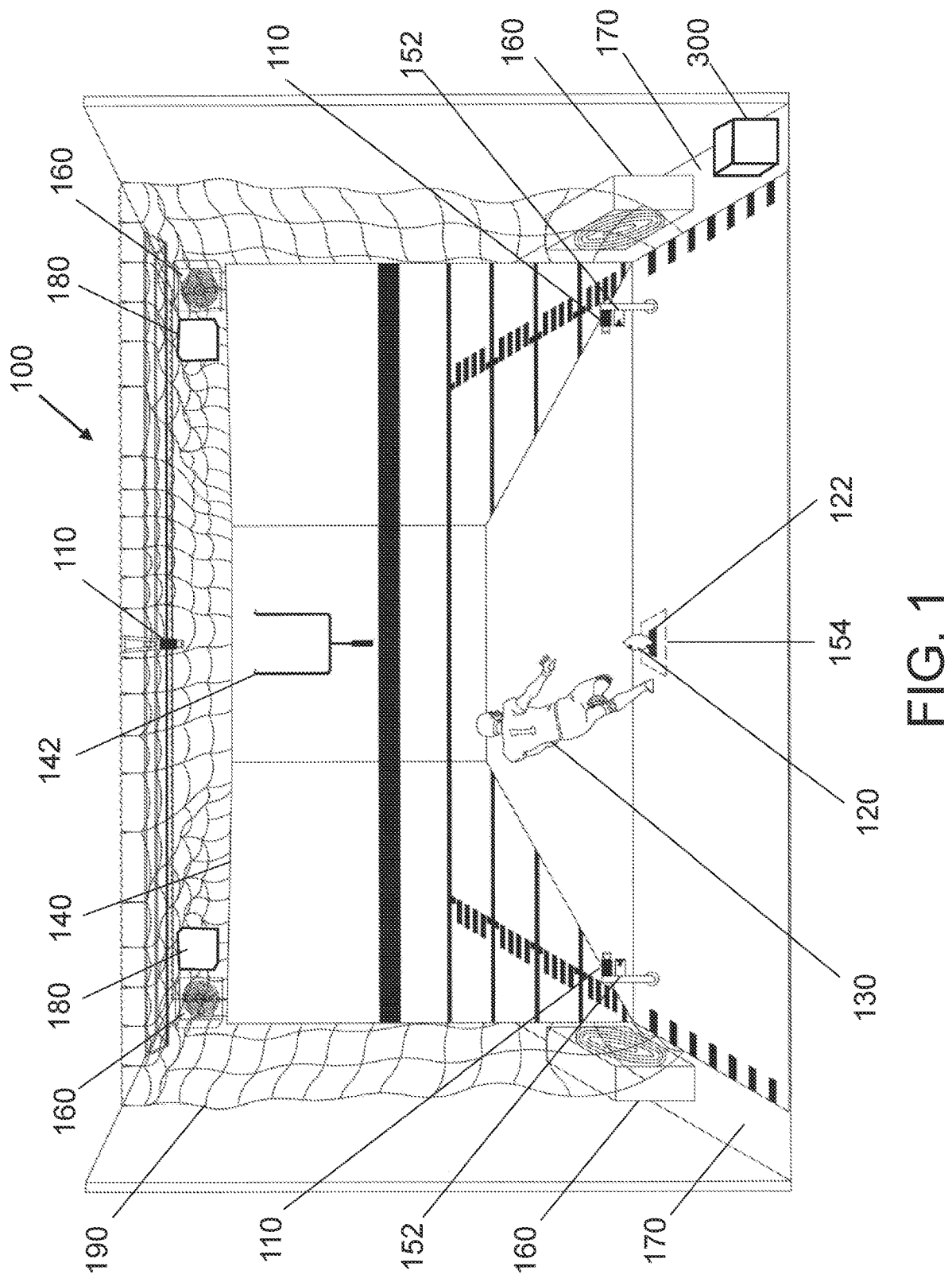
FIG. 1 is a diagram of a system for football training, in accordance with aspects of the disclosure.

The present disclosure relates generally to the field of sports training. More specifically, an aspect of the present disclosure provides systems and methods for providing instructional feedback.

Aspects of the present disclosure are described in detail with reference to the drawings wherein like reference numerals identify similar or identical elements.

Although the present disclosure will be described in terms of specific aspects and examples, it will be readily apparent to those skilled in this art that various modifications, rearrangements, and substitutions may be made without departing from the spirit of the present disclosure.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure. For illustrative purposes, the following detailed description is directed to football, however, it is within the scope of the present disclosure to provide instructional training feedback for soccer athlete training as well.

Figure 2:
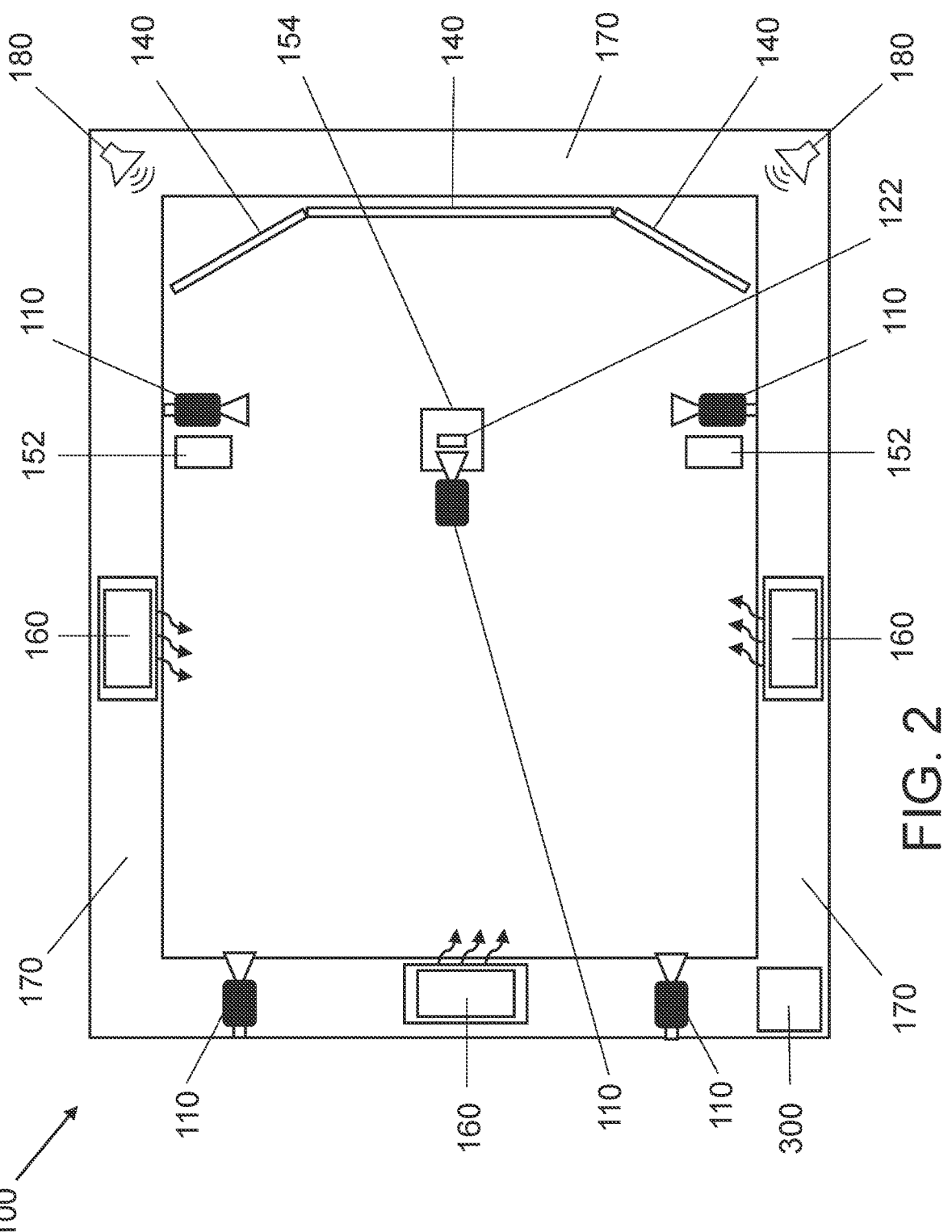
FIG. 2 is a top view of the system of FIG. 1, in accordance with aspects of the disclosure.
Figure 3:
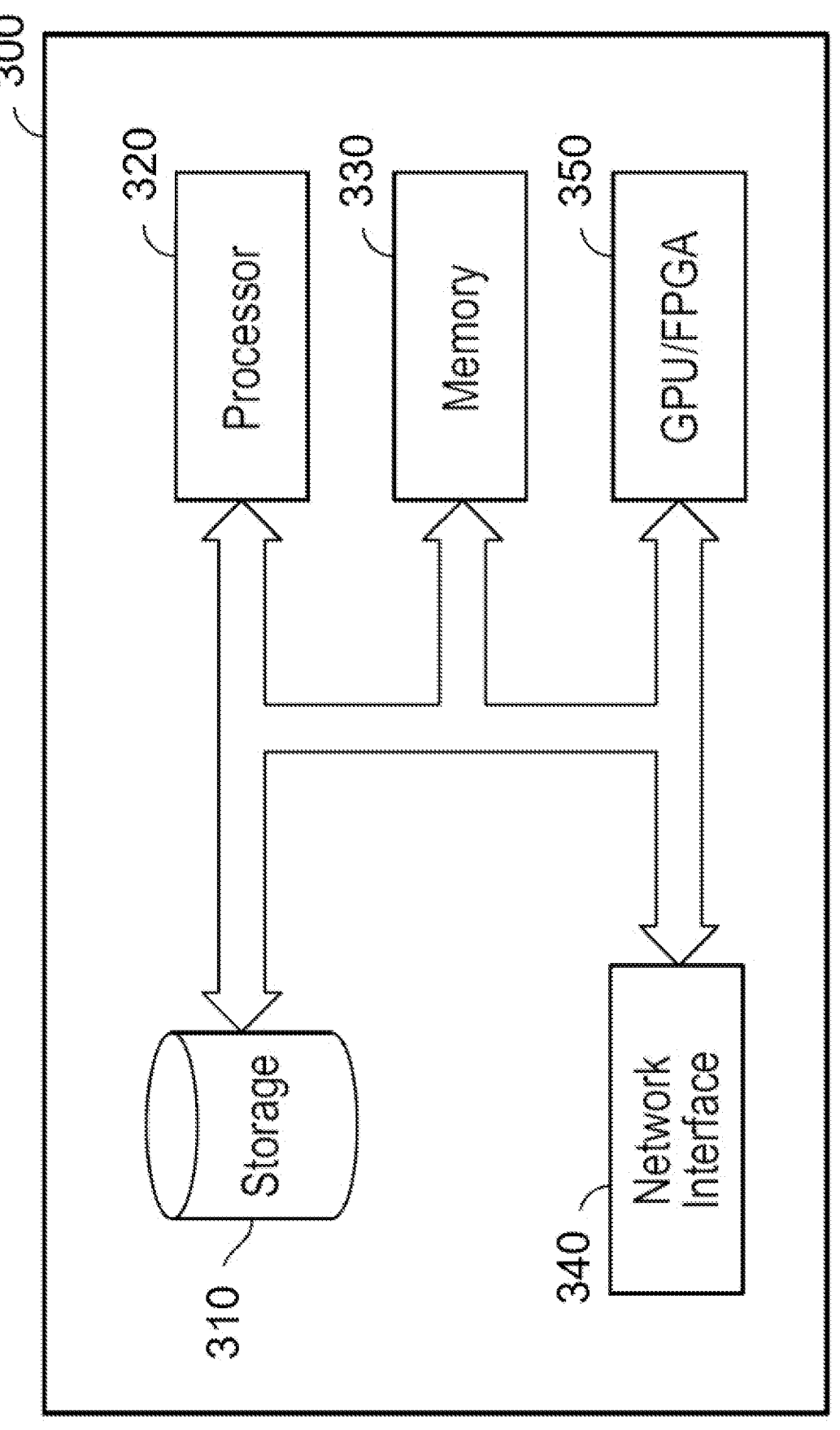
FIG. 3 is a block diagram of a controller configured for use with the system of FIG. 1, in accordance with aspects of the disclosure.

Referring to FIGS. 1 and 2, a system 100 for football training is shown. The system 100 is configured to provide instructional feedback regarding football training. As used herein, the term instructional feedback includes, for example, advice on how to kick or throw, position the body, and/or adjust posture. The system 100 generally includes one or more imaging devices 110 configured to capture real-time images indicating movement of a football 120 at different perspectives, one or more displays 140, and a controller 300 (FIG. 3). The football 120 may be mounted on a tee 122 so as to remain supported as a user 130 approaches the football 120.

The one or more imaging devices 110 are configured to capture real-time images indicating movement of the football 120 from a number of different perspectives. The real-time images may be still images and/or video. The one or more imaging devices 110 may generally be mounted so as to provide a left-hand and/or right-hand perspective of the football 120, a top-down perspective of the football 120, and a rear view of the football 120. In aspects, the one or more imaging devices 110 may be placed so as to provide a front view of the football 120 and/or an isometric view of the football 120. The one or more imaging devices 110 may be movable, and/or may be placed in locations so as to remain hidden from the sight of the user 130.

The controller 300 is configured to determine telemetry data of the football 120 based on the images captured by the one or more imaging devices 110. Telemetry data may include, for example, velocity, angle, position, trajectory, and/or any other suitable means for monitoring the football 120 over a period of motion. In aspects, the telemetry data may be determined using image recognition. For example, a series of captured real-time images of the football 120 may be analyzed for changes in position to extrapolate the trajectory of the football 120.

The system 100 may include a radar detector 152 and/or an infrared sensor 154. The radar detector 152 and/or the infrared sensor 154 may generally be placed on either side of the user 130 and/or may be placed adjacent the one or more imaging devices 110. When the football 120 is in motion, the radar detector 152 generates a signal. The telemetry data of the football 120 may be further computed in response to the signal generated by the radar detector 152, particularly the speed and direction of the football 120. The infrared sensor 154 may be placed in another suitable location, for example, beneath the initial position of the football 120. When the football 120 is in motion, the infrared sensor 154 generates a signal. The telemetry data of the football 120 may be further computed based on the signal generated by the infrared sensor 154.

Figure 4:
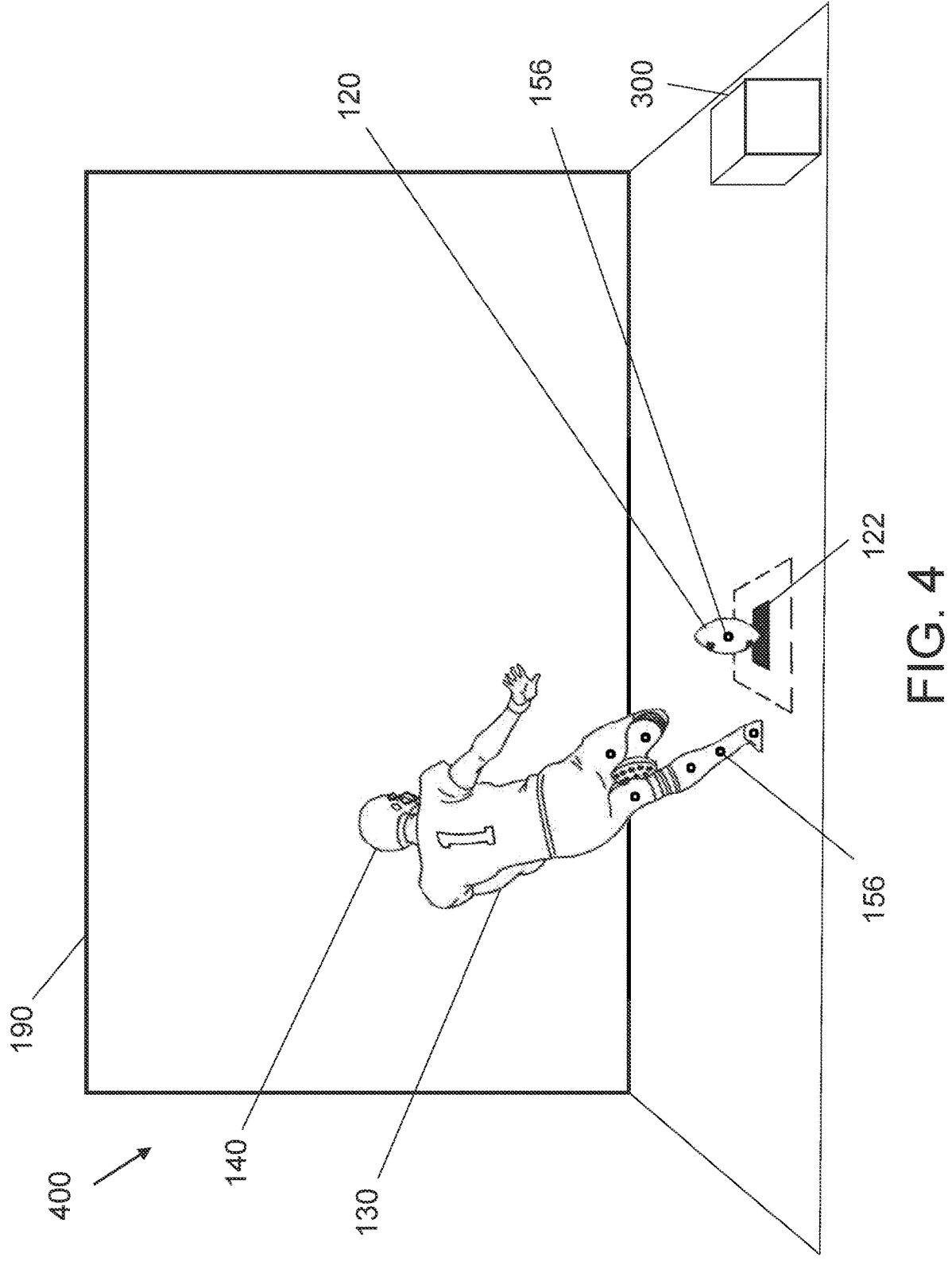
FIG. 4 is a diagram illustrating an example residential version of a system for football training, in accordance with aspects of the disclosure.

One or more motion sensors 156 (FIG. 4) may further capture the telemetry data of the football 120. The one or more motion sensors 156 may include, for example, accelerometers, gyroscopes, ultrasonic sensors, LEDs, structured light and structured light scanners, and/or tilt sensors. The one or more motion sensors 156 may be mounted on the user 130, the football 120, and/or any other suitable area of the system 100 (FIG. 4). For example, the one or more motion sensors 156 may be mounted by a strap, a hook and loop fastener, temporary adhesive, and/or other suitable means of attachment.

The controller 300 is further configured to determine instructional feedback in response to the telemetry data of the football 120. The one or more imaging devices 110 may capture real-time images of the user 130 as the user 130 interacts with the football 120, and the controller 300 may determine a motion of the user 130 based on the captured real-time images. The controller 300 may further determine instructional feedback in response to the motion of the user 130 and the telemetry data of the football 120. The instructional feedback may include images and/or video of the football 120 and/or the user 130. The instructional feedback may include text and/or symbols, for example, text instructions on how to kick the football 120, change body placement, and/or alter kick speed.

Once the instructional feedback is determined by the controller 300 based on the telemetry data of the football 120 and/or the motion of the user 130, the one or more displays 140 may display the instructional feedback. The one or more displays 140 may include, for example, a television screen, a projector screen, a monitor, and/or any other suitable means for displaying the instructional feedback. The instructional feedback may be displayed on a monitor (not shown) of the controller 300. Any information displayable on the monitor of the controller 300 may also be displayed on the one or more displays 140. The controller 300 may be on a movable cart (not shown) for ease of transportation and use.

The one or more displays 140 may be configured to display a virtual reality football environment to the user 130. This environment may include, for example, a field, weather, an audience, virtual players, and/or a target 142 for the user 130 to aim the football 120 toward. The user 130 may be able to determine the appearance of the virtual reality football environment by selecting options on a graphical user interface (not shown) of the system 100. For example, the target 142 could be disposed on different entities, such as goal posts or the virtual players. The brightness of the virtual reality football environment may be determined by the user 130, as may any weather present in the virtual reality football environment. The user 130 may select different locational appearances, containing a target 142 of different sizes and/or distances from the user 130. The presence of audience members, and the amount of audience members, may be determined by the user 130. The user 130 may select a program to practice a particular type of play, for example, the user 130 may choose to practice drop kicking, and may choose the number of plays to complete over the course of the program.

The system 100 may include physical simulation of the environment to provide an immersive experience to the user 130. For example, wind may be generated by a wind machine 160. The speed and direction of the wind generated by the wind machine 160 may be designated by the controller 300 or may be input by the user 130. The system 100 may include a speaker 180. The controller 300 or the user 130 may cause the controller 300 to generate simulated audience noise or other environmental noise to be played by the speaker 180. The volume of the speaker 180 may be designated by the controller 300 or input by the user 130. The system 100 may include means to simulate other forms of weather, such as rain, snow, and variations in temperature. A net 190 may be included in the system 100 to catch the football 120 after it has been set into motion by the user 130. The system 100 may adjust the lighting of the field to simulate different times of day and/or weather conditions, for example, during a blizzard or rain it may be darker out.

FIG. 3 illustrates controller 300 includes a processor 320 connected to a computer-readable storage medium or a memory 330. The controller 300 may be used to control and/or execute operations of the system 100. The computer-readable storage medium or memory 330 may be a volatile type of memory, e.g., RAM, or a non-volatile type of memory, e.g., flash media, disk media, etc. In various aspects of the disclosure, the processor 320 may be another type of processor, such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 330 can be random access memory, read-only memory, magnetic disk memory, solid-state memory, optical disc memory, and/or another type of memory. In some aspects of the disclosure, the memory 330 can be separate from the controller 300 and can communicate with the processor 320 through communication buses of a circuit board and/or through communication cables such as serial ATA cables or other types of cables. The memory 330 includes computer-readable instructions that are executable by the processor 320 to operate the controller 300. In other aspects of the disclosure, the controller 300 may include a network interface 340 to communicate with other computers or to a server. A storage device 310 may be used for storing data. The disclosed method may run on the controller 300 or on a user device, including, for example, on a mobile device, an IoT device, or a server system.

Referring to FIG. 4, in an aspect, a system 400 for football training may be configured for residential use. The system 400 may include one or more displays 140, a net 190, one or more motion sensors 156 (e.g., accelerometer s, gyroscopes, ultrasonic sensors, LEDs, structured light and structured light scanners, and/or tilt sensors), and a controller 300. The one or more displays 140 may include a virtual reality headset. The football 120 may be mounted on a tee 122 so as to reduce the difficulty of the user 130 making contact with the football 120. The net 190 is configured to catch the football 120 such that the football 120 remains contained within the system 400. The one or more motion sensors 156 may be mounted (e.g., via a strap, a hook and loop fastener, temporary adhesive, and/or other suitable means of attachment) on the user 130, the football 120, and/or any other suitable area of the system 400. Similar to system 100, system 400 is configured such that the one or more sensors 156 determine the motion of the football 120 and/or determine the motion of the user 130. Also like system 100, the controller 300 may be used to control and/or execute operations of the system 400. The controller 300 is configured to compute the telemetry data of the football 120 based on the motion of the football 120. Using the telemetry data of the football 120 and/or the determined motion of the user 130, the controller determines instructional feedback for the user 130. The instructional feedback may be displayed on the one or more displays 140 (e.g., the virtual reality headset) and/or on a monitor (not shown) of the controller 300.

Figure 5:
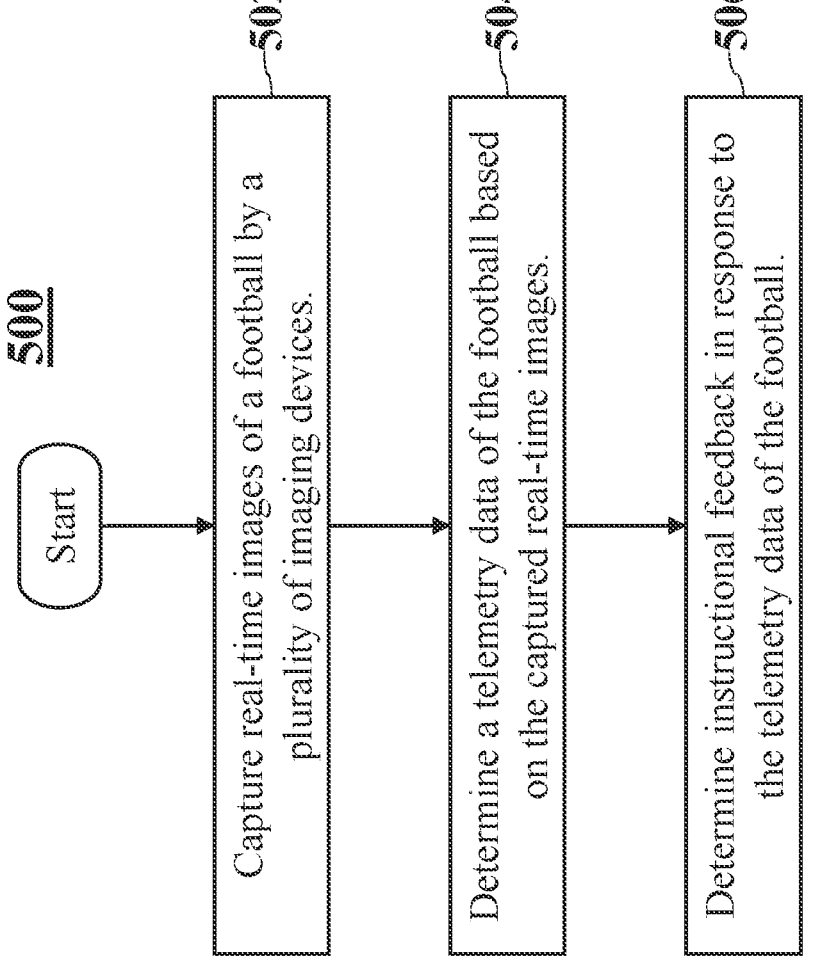
FIG. 5 is a flow diagram of a computer-implemented method for football training, in accordance with aspects of the present disclosure.

Referring to FIG. 5, a flow diagram for a method 500 of football training in accordance with the present disclosure is shown. Although the steps of FIG. 5 are shown in a particular order, the steps need not all be performed in the specified order, and certain steps can be performed in another order. For example, FIG. 5 will be described below, with a controller 300 of FIG. 3 performing the operations. In aspects, the operations of FIG. 5 may be performed all or in part by another device, for example, a server, a mobile device, such as a smartphone, and/or a computer system. These variations are contemplated to be within the scope of the present disclosure.

Before the method 500 begins, the user 130 may approach a graphical user interface (not shown) of the system 100, 400 and the user 130 may set a number of features of the virtual reality football environment (or e.g., soccer), such as the stadium and/or weather. For example, the user 130 may choose to set the virtual reality football environment at a particular stadium venue or an open field. The user 130 may determine whether the field is dimensioned, for example, for American football, Canadian football, or otherwise. The appearance of various items in and around the field may be set by the user 130, including, for example, the size and/or location of the goal posts, the location and/or dimensions of the team box, the presence of an audience, and/or the presence of a play clock. In aspects, the virtual reality football environment may be displayed onto the one or more displays 140.

Other features that the user 130 may select may include, for example, weather, audience volume, and/or lighting. In aspects, the user 130 may determine wind direction and speed, and the controller 300 may simulate the wind by way of a wind machine 160 (FIG. 1). Other weather conditions may be set by the user 130, including rain, snow, and/or temperature. In aspects, audience/fan noise, player noise, and/or weather noise may be generated by the controller 300 and played by a speaker 180 (FIG. 1).

The user 130 may select a program which instructs the user 130 to perform a certain type of football play. For example, the user 130 may choose a program for practicing drop kicks, requiring the user 130 to kick the football 120 toward a target 142. The user 130 may be able to specify the distance of the target 142 and/or the number of plays to be completed. Once selected by the user 130, the program may affect the appearance of the virtual reality football environment shown on the one or more displays 140. In aspects, the user may be able to change the goal post width or spacing.

Initially, at step 502, the user 130 approaches the football 120 and, depending on the selected program, kicks or throws the football toward the target 142 shown on the one or more displays 140. For example, if the user 130 is practicing field goals, the controller 300 may, based on the selected program, instruct the user 130 to kick the football 120 at a target 142 disposed between the goal posts. As the user 130 kicks the football 120, the one or more imaging devices 110 capture real-time images of the football 120 in motion.

Next, at step 504, the controller 300 determines the telemetry data of the football 120. The telemetry data may be determined based on the captured real-time images. In aspects, the determination of the telemetry data of the football 120 may be performed based on image recognition. In aspects, the controller 300 may cause a radar detector 152 to generate a signal that indicates movement of the football 120. The telemetry data may be further determined based on the signal. In aspects, the controller 300 may cause an infrared sensor 154 to generate a signal indicating movement of the football 120. The telemetry data may be further determined in response to the signal.

Next, at step 506, the controller 300 determines instructional feedback based on the telemetry data of the football 120. In aspects, the controller 200 may capture and analyze images of the user for providing instructional feedback. For example, the one or more imaging devices 110 may capture real-time images of the user 130 as the user kicks the football. The controller 300 may determine a motion of the user 130 in response to the captured real-time images of the user 130. The motion of the user may also be determined using a radar detector 152, an infrared sensor 154 (FIG. 1), and/or one or more motion sensors 156. The instructional feedback may further be determined based on the motion of the user 130 and the telemetry data of the football 120. The instructional feedback may be displayed on the one or more displays 140.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for football training comprising:
a plurality of imaging devices configured to capture real-time images indicating movement of a football, wherein the plurality of imaging devices are further configured to capture the real-time images at different perspectives;
a processor; and
a memory, including instructions stored thereon, which, when executed by the processor, cause the system to:
    capture real-time images of the football, including at least a top-down perspective, a rear perspective, and a side perspective of the football;
    capture real-time images of a user interacting with the football;
    determine a motion of the user, based on the captured real-time images of the user;
    determine a telemetry data of the football based on the captured real-time images of the football,
        wherein the telemetry data is determined using image recognition by analyzing the captured real-time images of the football for changes in position of the football to extrapolate a trajectory of the football, and wherein the telemetry data includes a velocity, an angle, a position, and the trajectory of the football; and
    determine instructional feedback in response to the telemetry data of the football and the determined motion of the user,
        wherein the instructional feedback includes at least one of text, images, video, or symbols providing instructions for improved body placement change based on the determined telemetry data of the football in view of the determined motion of the user captured by the plurality of imaging devices, and wherein the instructional feedback further includes instructions on how to alter kick speed.

2. The system of claim 1, further comprising one or more displays, wherein the instructions, when executed by the processor further cause the system to:
determine the instructional feedback based on motion of the user based on one or more motion sensors; and
display the instructional feedback onto the one or more displays,
wherein the one or more motion sensors are configured to be mounted on the user, and wherein the one more motion sensors are mounted by at least one of a strap, a hook and loop fastener, temporary adhesive, and/or other suitable means of attachment.

3. The system of claim 2, wherein the instructions, when executed by the processor further cause the system to display a virtual reality football environment onto the one or more displays.

4. The system of claim 1, further comprising a radar detector configured to generate a signal indicating movement of the football, wherein the telemetry data is further determined based on the signal.

5. The system of claim 1, further comprising an infrared sensor configured to generate a signal indicating movement of the football, wherein the telemetry data is further determined based on the signal.

6. The system of claim 1,
wherein the instructional feedback further provides advice on how to kick or throw, position the body, and adjust posture.

7. The system of claim 1, further comprising a wind machine, wherein the instructions, when executed by the processor further cause the system to selectively generate wind by the wind machine.

8. The system of claim 7, wherein the wind machine is movable and disposed in an alley way adjacent to one or more displays.

9. The system of claim 1, further comprising a speaker, wherein the instructions, when executed by the processor further cause the system to:
generate simulated audience noise; and
play the simulated audience noise by the speaker.

10. A computer-implemented method for football training comprising:
capturing real-time images of a football by a plurality of imaging devices, including at least a top-down perspective, a rear perspective, and a side perspective of the football;
capturing real-time images of a user interacting with the football;
determining a motion of the user based on the captured real-time images of the user;
determining a telemetry data of the football based on the captured real-time images of the football,
wherein the telemetry data is determined using image recognition by analyzing the captured real-time images of the football for changes in position of the football to extrapolate a trajectory of the football, and wherein the telemetry data includes a velocity, an angle, a position, and the trajectory of the football; and
determining instructional feedback in response to the telemetry data of the football and the determined motion of the user,
wherein the instructional feedback includes at least one of text, images, video, or symbols providing instructions for improved body placement change based on the determined telemetry data of the football in view of the determined motion of the user captured by the plurality of imaging devices, and wherein the instructional feedback further includes instruction on how to alter kick speed.

11. The computer-implemented method of claim 10, further comprising
displaying instructional feedback onto one or more displays.

12. The computer-implemented method of claim 11, further comprising
displaying a virtual reality football environment onto the one or more displays.

13. The computer-implemented method of claim 10, further comprising:
generating a signal indicating movement of the football by a radar detector; and
further determining the telemetry data based on the signal.

14. The computer-implemented method of claim 10, further comprising:
generating a signal indicating movement of the football by an infrared sensor; and
further determining the telemetry data based on the signal.

15. The computer-implemented method of claim 10, further comprising simulating wind by a wind machine.

16. The computer-implemented method of claim 10, further comprising:
generating simulated audience noise; and
playing the simulated audience noise by a speaker.

17. A non-transitory computer-readable medium storing instructions which, when executed by a processor, cause the processor to perform a computer-implemented method for football training, comprising:
capturing real-time images of a football by a plurality of imaging devices, including at least a top-down perspective, a rear perspective, and a side perspective of the football;
capturing real-time images of a user interacting with the football;
determining a motion of the user based on the captured real-time images of the user;
determining a telemetry data of the football based on the captured real-time images of the football,
wherein the telemetry data is determined using image recognition by analyzing the captured real-time images of the football for changes in position of the football to extrapolate a trajectory of the football, and wherein the telemetry data includes a velocity, an angle, a position, and the trajectory of the football; and
determining instructional feedback in response to the telemetry data of the football and the determined motion of the user,
wherein the instructional feedback includes at least one of text, images, video, or symbols providing instructions for improved body placement change based on the determined telemetry data of the football in view of the determined motion of the user captured by the plurality of imaging devices, and wherein the instructional feedback further includes instruction on how to alter kick speed.

* * * * *